United States Patent [19]

Okuhara et al.

[11] Patent Number: 5,080,188
[45] Date of Patent: Jan. 14, 1992

[54] MOUNTING STRUCTURE FOR A VEHICLE DECELERATION SENSOR

[75] Inventors: Hisakazu Okuhara; Koichi Kamiji; Masao Mochiji; Junichi Fukuda, all of Saitama, Japan

[73] Assignee: Honda Giken Kogyo Kabushiki Kaisha, Tokyo, Japan

[21] Appl. No.: 468,312

[22] Filed: Jan. 23, 1990

[51] Int. Cl.5 .............................................. B60R 21/00
[52] U.S. Cl. ................... 180/282; 280/735; 296/187; 296/205; 340/440
[58] Field of Search ............... 180/271, 274, 281, 282, 180/311; 280/781, 783, 727, 728, 734, 735, 801, 806; 340/438, 440, 669; 296/187, 203, 204, 205

[56] References Cited

U.S. PATENT DOCUMENTS

| | | | |
|---|---|---|---|
| 2,899,214 | 8/1959 | D'Antini | 280/734 |
| 3,815,703 | 6/1974 | De Lorean | 280/734 |
| 4,183,574 | 1/1980 | Klie et al. | 280/781 |
| 4,346,914 | 8/1982 | Livers et al. | 180/274 |
| 4,881,754 | 11/1989 | Lütze et al. | 280/734 |

FOREIGN PATENT DOCUMENTS

| | | | |
|---|---|---|---|
| 2149158 | 4/1972 | Fed. Rep. of Germany | 280/735 |
| 2415396 | 10/1974 | Fed. Rep. of Germany | 280/735 |
| 1-167946 | 11/1989 | Japan . | |

Primary Examiner—Charles A. Marmor
Assistant Examiner—Tamara L. Finlay
Attorney, Agent, or Firm—Armstrong, Nikaido, Marmelstein, Kubovcik & Murray

[57] ABSTRACT

A mounting structure for a vehicle deceleration sensor, comprising a deceleration sensor mounted on a part of a vehicle body where a longitudinal end of a front side member extending along a fore-and-aft direction of the vehicle body on one side thereof and a bulkhead separating a passenger compartment from a front part of the vehicle body are joined together with a part of the deceleration sensor protruding into the hollow interior of the front side member. Thus, a deceleration resulting from a vehicle crash is quickly transmitted to the deceleration sensor through the front side member, and the deceleration sensor is protected from adverse environmental effects as it may be located in the interior of the front side member.

4 Claims, 1 Drawing Sheet

MOUNTING STRUCTURE FOR A VEHICLE DECELERATION SENSOR

TECHNICAL FIELD

The present invention relates to a mounting structure for a vehicle deceleration sensor which is designed to detect a vehicle crash so that a passive vehicle occupant protection system may be activated in order to protect vehicle occupants from injuries.

BACKGROUND OF THE INVENTION

A deceleration sensor is necessary as means for producing a trigger signal upon occurrence of a vehicle crash and transmitting a trigger signal to passive vehicle occupant protection systems such as air bags, seat belt pre-loaders and other passive vehicle occupant restraint systems. Typically, such a vehicle deceleration sensor is provided with a mass and a displacement sensor which detects movement of the mass by inertia. Since the reliable and precise activation of a deceleration sensor is quite essential for satisfactory performance of a vehicle occupant protection system, a various considerations must be made as to the location for mounting a vehicle deceleration sensor.

Following are primary considerations that should be made in deciding the location for mounting a deceleration sensor:

(1) The location must be able to transmit the deceleration to the sensor without fail and with a minimum time delay;

(2) The location must be as close to the actuator of the vehicle occupant protection system as possible in order to minimize the amount of wiring and ensure the integrity of the wiring in case of a vehicle crash; and (3) The location must be surrounded in a favorable environment in order to ensure satisfactory performance of the deceleration sensor over its entire service life.

In regards to consideration (1), the deceleration sensor is desired to be mounted on a rigid body member such as front side member, in particular at its front end adjoining a front bumper. However, in this case, the deceleration sensor tends to be remote from the vehicle protection system, and the wires connecting them to each other tend to be more prolonged than desired. Furthermore, the environment is not favorable because the deceleration sensor will be exposed to dust and moisture. In regards to consideration (2) and (3), the interior of the passenger compartment would be a preferred place for mounting a deceleration sensor. However, in this case, since the front part of the vehicle is designed to have buffering effect in case of a vehicle crash by deforming itself and delaying and reducing transmission of impulsive deceleration to the passenger compartment, the deceleration sensor may not be able to detect a deceleration and transmit a trigger signal to the vehicle occupant protection system as quickly as desired.

In view of such problems in regards to the selection for a place to mount a vehicle deceleration sensor, a primary object of the present invention is to provide a mounting structure for a vehicle deceleration sensor which can detect a deceleration indicative of a vehicle crash with a minimum time delay.

A second object of the present invention is to provide a mounting structure for a vehicle deceleration sensor which protects the deceleration sensor from external degrading influences.

A third object of the present invention is to provide a mounting structure for a vehicle deceleration sensor which can place a deceleration sensor sufficiently close to a vehicle protection system which is to be triggered by this deceleration sensor.

These and other objects of the present invention can be accomplished by providing a mounting structure for a vehicle deceleration sensor, comprising a deceleration sensor mounted on a part of a vehicle body where a longitudinal end of a front side member extending along a fore-and-aft direction of the vehicle body on one side thereof and a bulkhead separating a passenger compartment from a front part of the vehicle body are joined together.

Thus, a deceleration resulting from a vehicle crash is quickly transmitted to the deceleration sensor through the front side member through the opening, and the deceleration sensor is protected from adverse environmental effects.

In particular, if the part of the bulkhead is provided with an opening which is communicated with the interior of the hollow front side member, and the deceleration sensor is mounted on the bulkhead with a part thereof projecting into the interior of the hollow front side member, the deceleration sensor would not protrude into the passenger compartment.

According to a particularly preferred embodiment, the deceleration sensor is provided with a mounting flange which is attached to a peripheral part of the bulkhead around the opening, and a protective cover covering the part of the deceleration sensor projecting into the interior of the front side member and having a flange which is clamped between the peripheral part of the bulkhead and the mounting flange of the deceleration sensor. Thus, the deceleration sensor is securely protected from intrusion of dust or moisture without complicating the process of manufacturing and assembling the deceleration sensor.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Figure 1:
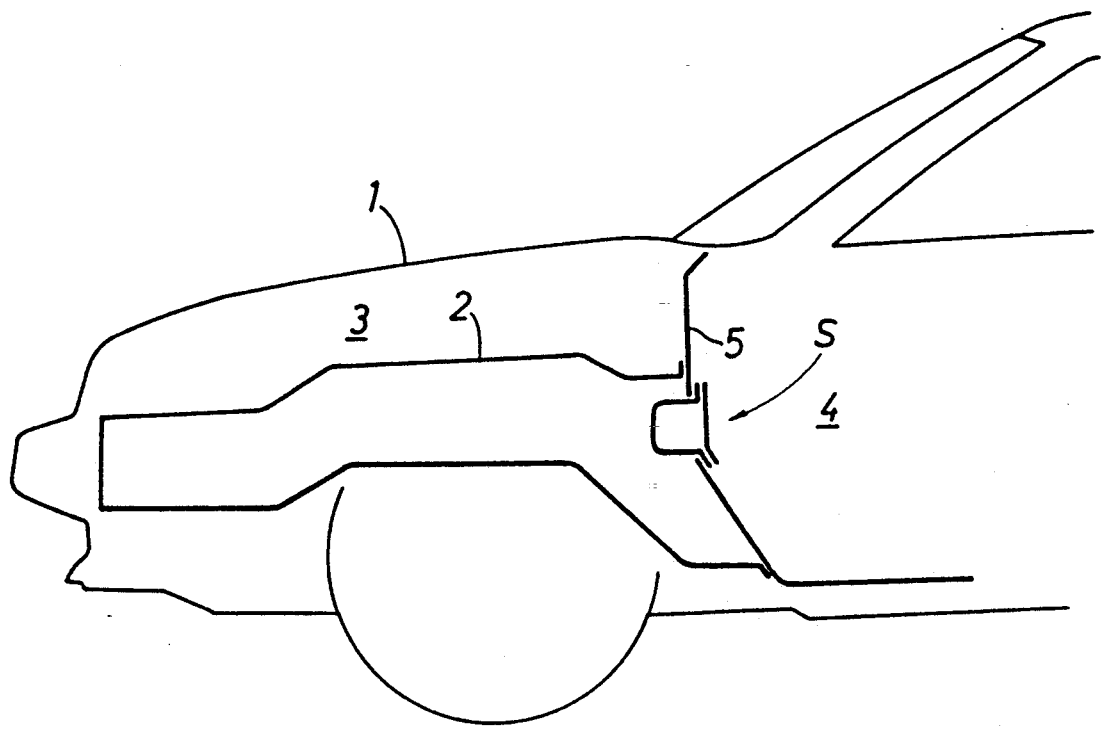
FIG. 1 is a simplified side view of a front part of a vehicle body to which a preferred embodiment of the present invention is applied.

Referring to FIG. 1, the illustrated vehicle body has a monocoque structure consisting of a plurality of stamped sheet metal parts which are joined together by welding, and includes a pair of front side members 2 extending in a fore-and-aft direction over wheel houses and along either side of an engine room 3. Each of the front side members 2 has a hollow and closed rectangular cross section. Its rear end is attached to a dashboard panel 5 serving as a bulkhead separating the engine room 3 from a passenger compartment 4. A deceleration sensor assembly S is provided at the rear end of the front side member 2 as illustrated in FIG. 1.

Figure 2:
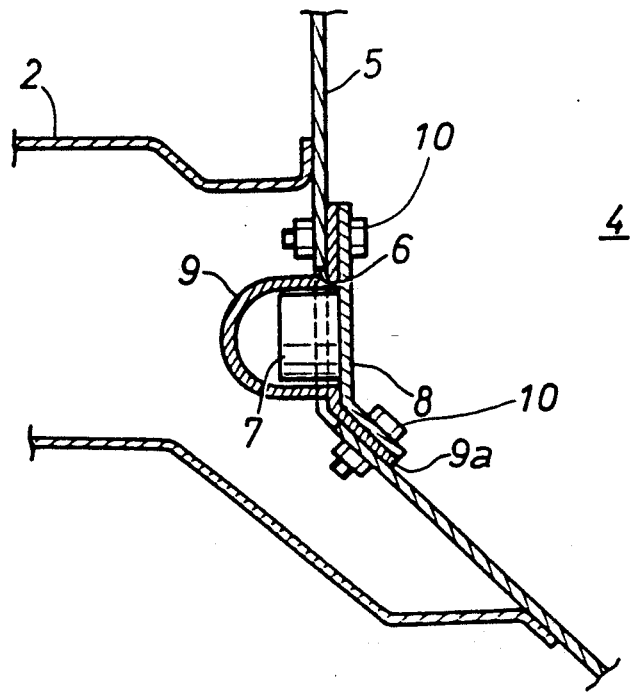
FIG. 2 is an enlarged sectional view of the preferred embodiment of the mounting structure for a vehicle deceleration sensor according to the present invention.

Referring to FIG. 2, a part of the dashboard panel 5 attached to the rear end of the front side member 2 is provided with a circular opening 6 communicating with the interior of the front side member 2. A circular base plate 8 carrying a deceleration sensor 7 on one side thereof in a concentric fashion is fitted onto the opening 6 of the dashboard panel 5 with the deceleration sensor 7 projecting into the interior of the front side member 2. The deceleration sensor 7 is encased in a protective cap 9 having a mounting flange 9a which is interposed between the peripheral part of the base plate 8 and the opposing surface of the dashboard panel 5 surrounding the opening 6, and both the base plate 8 and the mounting flange 9a of the protective cap g are secured to the dashboard panel 5 by common screws 10.

The deceleration sensor 7 typically includes a mass suspended by a spring, and a displacement of the mass under a deceleration indicative of a vehicle crash is detective by a displacement sensor although this is not shown in the drawings. The output signal from this deceleration sensor is supplied to a vehicle occupant protection system such as a passive occupant restraint system which is also not shown in the drawings.

Typically, the vehicle body is designed in such a manner that the full impact of a vehicle crash is prevented to be transmitted to the passenger compartment through a planned deformation of a front part of the vehicle crash. Therefore, if a deceleration sensor is simply mounted in a passenger compartment, the sensitivity of the deceleration sensor will be accordingly reduced. On the other hand, if the deceleration sensor is mounted on a front part of the vehicle body such as its bumper, it may be highly sensitive but it may be damaged before it can produce a trigger signal or it may be exposed to moisture and dust which may eventually cause a failure after an extended period of time.

However, according to the present invention, the deceleration sensor can accurately and quickly detect a deceleration indicative of a vehicle crash owing to the capability of the front side member to transmit such a deceleration and is protected from adverse environment influences as it is enclosed in the hollow front side member. Furthermore, as the deceleration projects into the interior of the front side member, no part of the deceleration sensor needs to protrude into the passenger compartment in any unattractive fashion. Furthermore, it may be placed close to a vehicle occupant protection system which is typically provided in the dashboard or other parts within the passenger compartment, and the amount of the wiring therebetween can be reduced.

While the invention has been particularly shown and described in reference to preferred embodiments thereof, it will be understood by those skilled in the art that changes in form and details may be made therein without departing from the spirit and scope of the invention.

What we claim is:

1. A mounting structure for a vehicle deceleration sensor, comprising:
   a deceleration sensor mounted on a part of a vehicle body where a longitudinal end of a hollow front side member extending along fore-and-aft direction of said vehicle body on one side thereof and a bulkhead separating a passenger compartment from a front part of said vehicle body are joined together, wherein a portion of said bulkhead is provided with an opening which is communicated with an interior portion of said front side member, and said deceleration sensor is mounted on said bulkhead with a part thereof projecting into said interior of said front side member through said opening.

2. A mounting structure for a vehicle deceleration sensor, comprising a deceleration sensor, wherein said deceleration sensor is mounted on a front bulkhead of a vehicle body separating a passenger compartment from a front part of said vehicle body, and wherein a longitudinal end of a hollow front side member extending longitudinally along a fore-and-aft direction of said vehicle body on one side thereof abuts said bulkhead, said deceleration sensor facing a hollow interior portion of said front side member.

3. A mounting structure for a vehicle deceleration sensor according to claim 2, wherein a portion of said bulkhead is provided with an opening which is communicated with an interior portion of sad hollow front side member, and said deceleration sensor is mounted on said bulkhead with a part thereof projecting into said interior of a hollow front side member through said opening.

4. A mounting structure for a vehicle deceleration sensor according to claim 3, wherein said deceleration sensor is provided with a mounting flange which is attached to a peripheral part of said bulkhead around said opening, and a protective cover covering a portion of said deceleration sensor projecting into said interior of said front side member and having a flange which is clamped between said peripheral part of said bulkhead and said mounting flange of said deceleration sensor.

* * * * *